Jan. 8, 1924. 1,480,071

V. F. HRACHOVINA

BED ATTACHMENT FOR AUTOMOBILES

Filed May 31, 1923 6 Sheets-Sheet 3

Inventor
Vincent F. Hrachovina
By his Attorney
H. S. Johnson

Jan. 8, 1924.  
V. F. HRACHOVINA  
1,480,071  
BED ATTACHMENT FOR AUTOMOBILES  
Filed May 31, 1923  
6 Sheets-Sheet 4

Inventor  
Vincent F. Hrachovina  
By his Attorney  
H. S. Johnson

Jan. 8, 1924.
V. F. HRACHOVINA
BED ATTACHMENT FOR AUTOMOBILES
Filed May 31, 1923
1,480,071
6 Sheets-Sheet 5
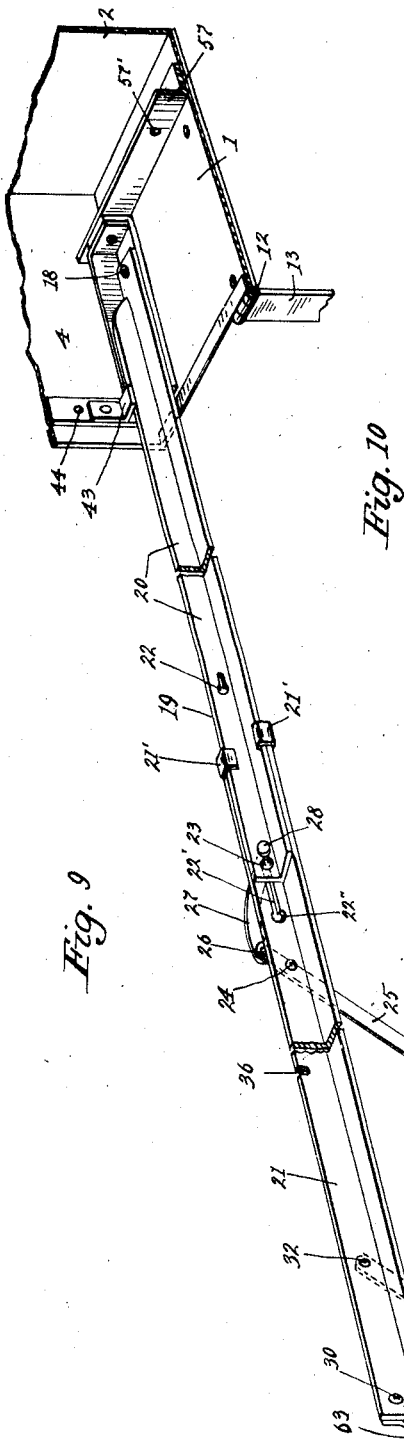
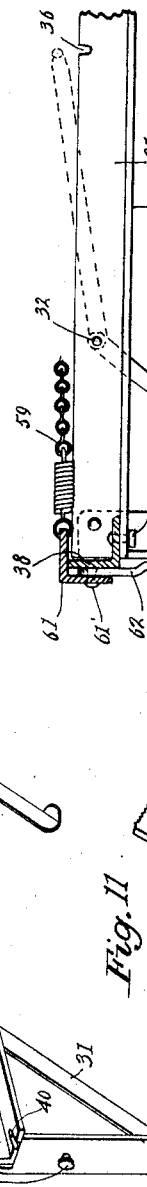
Inventor
Vincent F. Hrachovina
By his Attorney
H. S. Johnson Jan. 8, 1924.
V. F. HRACHOVINA
1,480,071
BED ATTACHMENT FOR AUTOMOBILES
Filed May 31, 1923      6 Sheets-Sheet 6
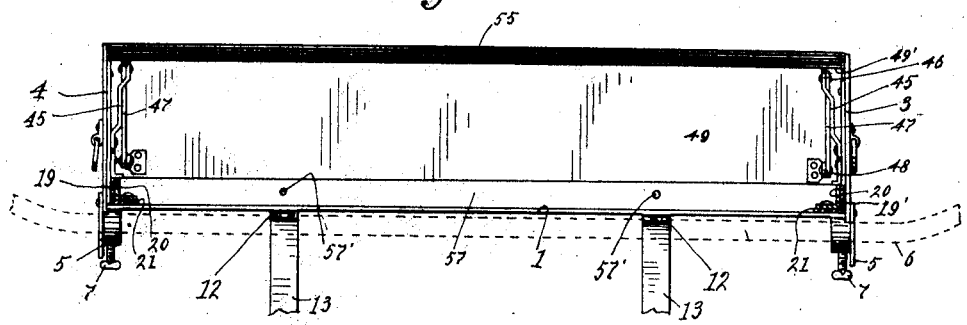
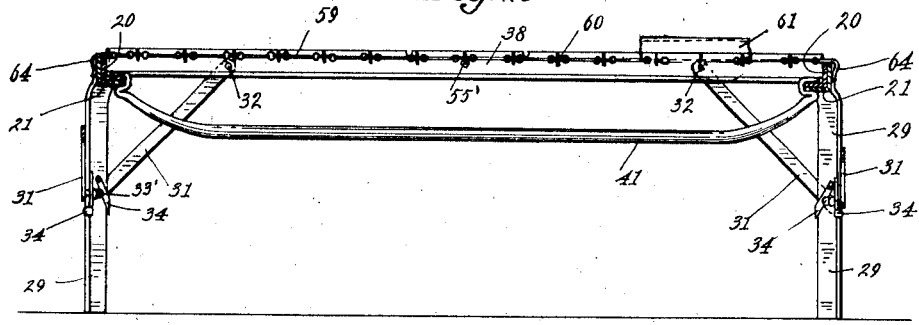
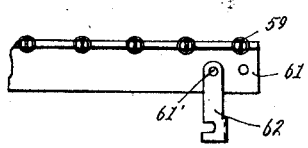
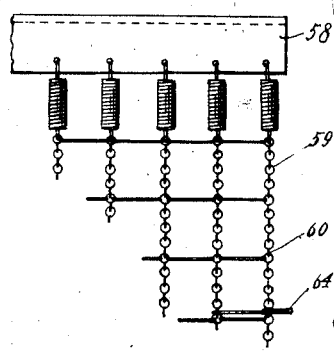
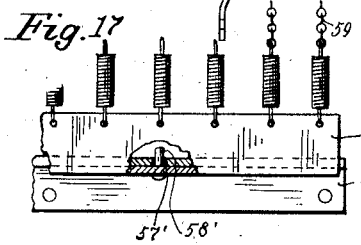
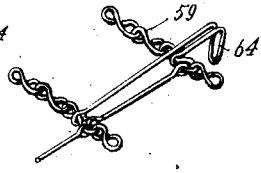
Inventor
Vincent F. Hrachovina
By his Attorney
H. S. Johnson Patented Jan. 8, 1924.

1,480,071

UNITED STATES PATENT OFFICE.

VINCENT F. HRACHOVINA, OF ST. PAUL, MINNESOTA.

BED ATTACHMENT FOR AUTOMOBILES.

Application filed May 31, 1923. Serial No. 642,531.

*To all whom it may concern:*

Be it known that I, VINCENT F. HRACHOVINA. a citizen of the United States, residing at St. Paul, in the county of Ramsey and State of Minnesota, have invented certain new and useful Improvements in Bed Attachments for Automobiles, of which the following is a specification.

This invention relates to collapsible devices adapted to be carried on the running boards of automobiles, and has for its main object to provide a collapsible combination bed spring and table top support, wherein a part of the structure may be adjusted to render it available as a support, either for a bed spring or a table, certain new and novel features of construction being resorted to, to effect a cheap and durable collapsible table top which may be conveniently concealed in a container.

A further object of the invention is to provide an improved combination bed and table structure, embodying certain novel features of construction, whereby essential parts of the bed and table form part of an enclosure for storing the bed and table in collapsed state, as a protection against the weather, the enclosure itself embodying novel features of construction whereby a side and the cover may be utilized as bench tops.

Other objects of the invention will be pointed out as this specification progresses, the invention consisting in the construction, combination, and arrangement of parts hereinafter described and specifically claimed.

In the accompanying drawings, forming part of this specification:

Figure 9, is a perspective view of the left hand side rail of the bed frame.

Figure 10, is a fragmentary view of the side and end rail of the bed frame, showing part of a leg.

Figure 11, is a perspective view of a detail.

Figure 12, is a sectional view on line 12—12 of Figure 1.

Figures 13 to 17, inclusive, are views of details.

Figure 18, is a fragmentary perspective view of a part of the table top plates.

Figure 19, is an end view of the table top plates showing them in collapsed superposed position.

Figure 20, is a fragmentary side view of the right hand bed rail.

Figure 21, is a fragmentary perspective view illustrating the methods of locking the bed frame braces to the leg of the bed frame.

Figure 22, is a front view of the box, the cover and front side having been removed.

Figure 2:
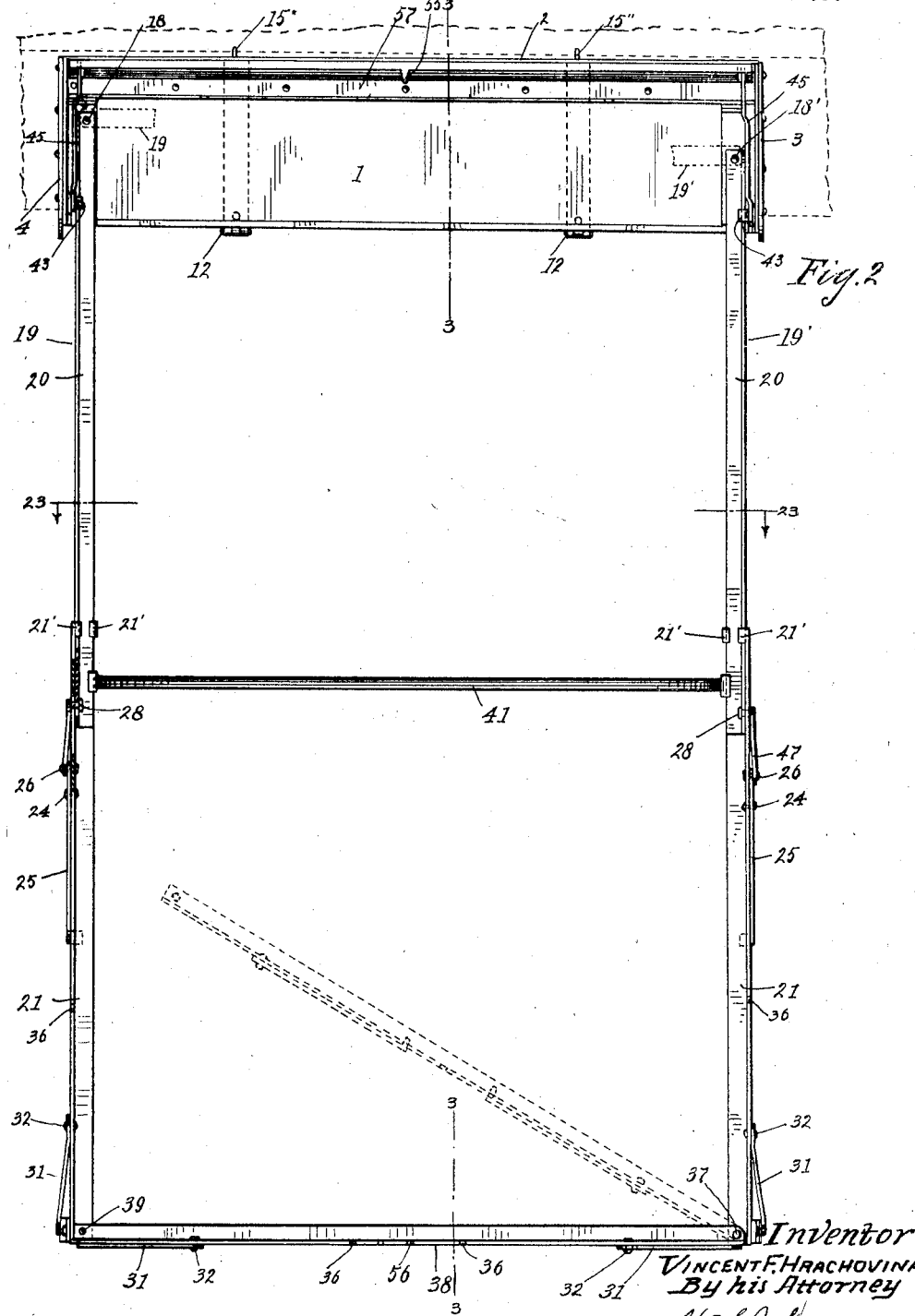
Figure 2, is a plan view of the bed frame, shown in extended position.

Figure 23, is a sectional view on line 23—23 of Figure 2; and

Figure 24, is a fragmentary perspective view of a part of the bed spring.

The invention comprises a box having a bottom 1, an inner side wall 2, and end walls 3 and 4. Secured, respectively, to the end walls 3 and 4 are clamps 5, each clamp extending around the front edge of a running board 6 of an automobile, and having a suitable thumb screw 7, threaded in an arm 8, which latter extends under the running board. By tightening the screws the box may be removably secured in position.

Figure 1:
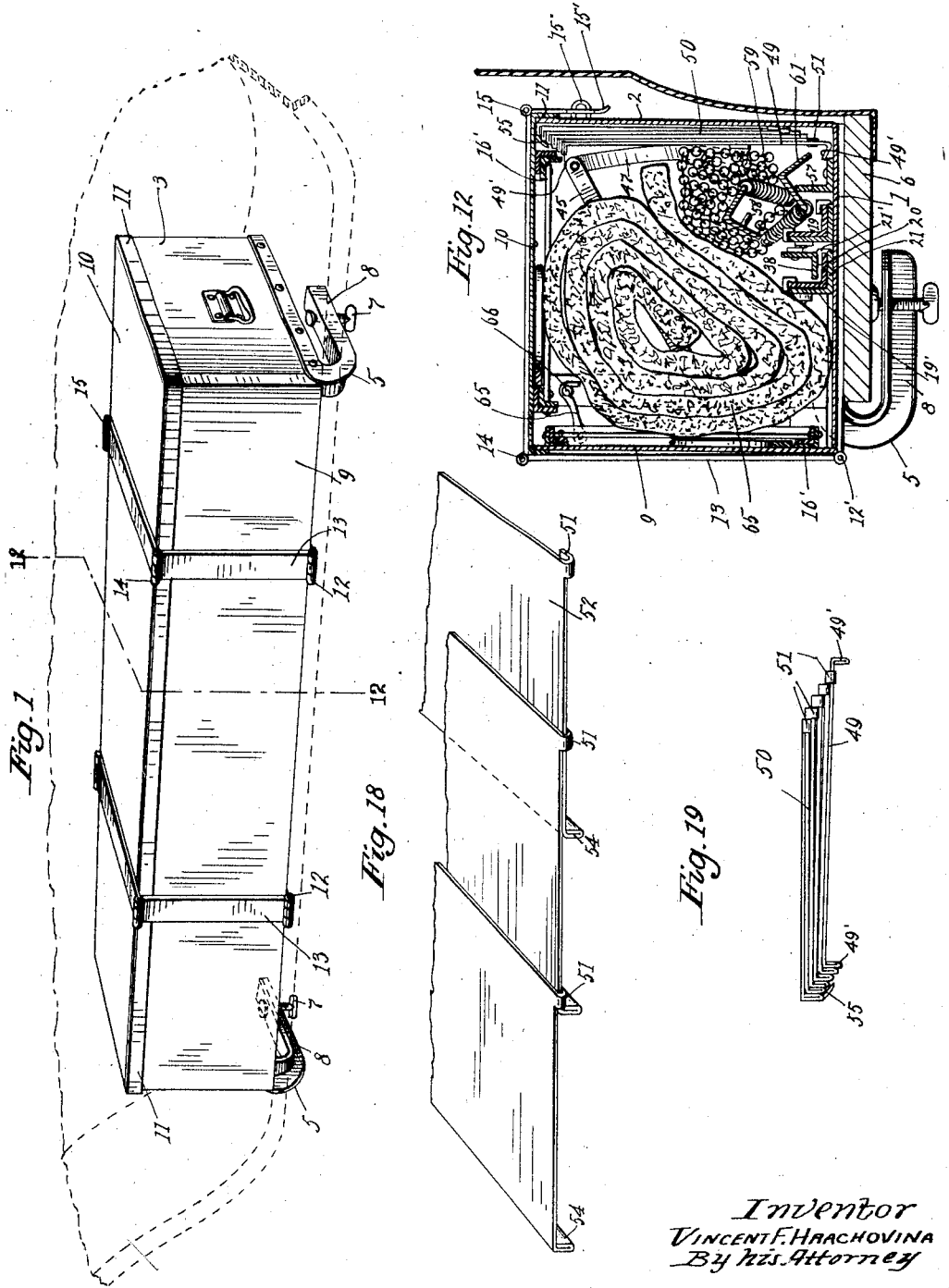
Figure 1, is a perspective view of a box adapted to contain a folded bed and table, the box being shown clamped to a running board of an automobile, which latter is shown in dotted lines.

The box is further provided with a front wall 9 and a cover 10, said cover having a depending surrounding flange 11 extending over the sides and ends of the box, as shown in Figures 1 and 12.

Hinged at 12 to the front lower edge of the box, are a pair of strap members 13, each having intermediate hinge connections 14 and 15, and terminating in a hasp member 15', having a slot adapted to loosely receive the staple 15'' secured to the inner wall 2 of the box. The strap members 13 are constructed to closely embrace the front, top, and part of the rear wall of the box to enable the hasps to engage the staples.

Figure 5:
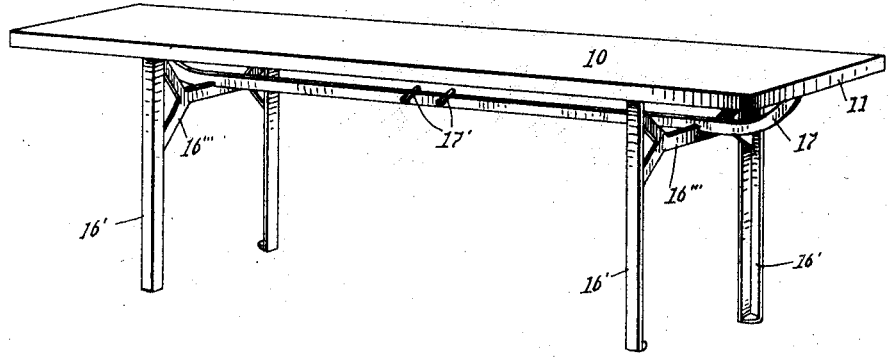
Figure 5, is a perspective view of one of the foldable benches shown in unfolded position.
Figure 6:
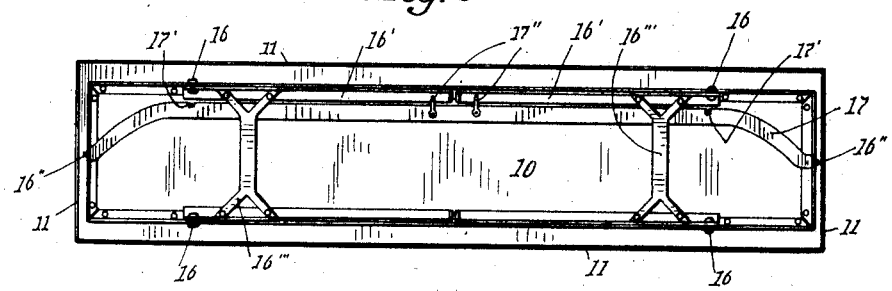
Figure 6, is a view of the under side of the bench shown in Figure 5, showing it in folded position.
Figure 7:
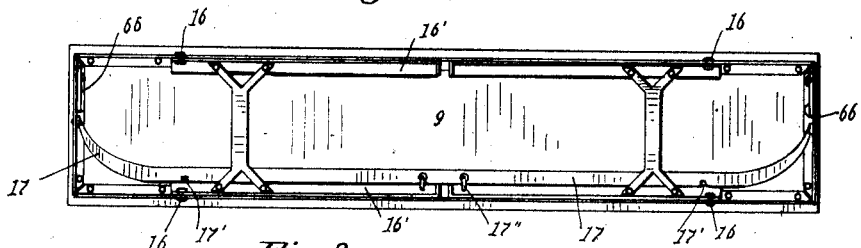
Figure 7, is a view of the inside of the box, the front side of the box being omitted.

Pivotally mounted on the under side of the cover by means of pivots 16, respectively, are a pair of legs 16', said legs being mounted to fall flatly inwardly toward each other against the under side of the cover. Pivoted at its ends, as at 16", to the under side of the cover, to swing in a vertical plane at right angles to the cover, is a brace member 17, said brace member being provided with notches 17' adapted to engage with cross braces 16''' forming part of said legs, whereby the latter may be held in unfolded operative position, as indicated in Figure 5 of the drawings.

Secured to the brace member 17 are suitable pivotally mounted keepers 17", adapted to be swung into overlapping position with respect to said legs when the latter are in folded position, to so hold them.

Secured to the under side of the front wall 9 of the box, are a pair of legs and a brace member constructed substantially similar to those just described for the cover 10, the wall 9 being adapted to be supported at its lower edge on the strap members 13 (Figure 12) to hold it vertically in alinement with the rear wall 2 of the box.

Pivoted by means of the pivot pins 18 and 18' to the floor 1 of the box to swing in a horizontal plane, are a pair of collapsible side rails 19 and 19', respectively, (Figure 2). It will be noted that the pivot pin 18 is spaced a lesser distance from the rear wall 2 of the box than the pivot 18', for a purpose hereinafter explained. Each of the side rails 19 and 19' is formed of two bars of angle iron, which may be termed component rail members, the inner angle bar 20 being slidably positioned in the inner angle of the outer angle bar 21, the vertical legs of the angle irons forming the respective side rails, constituting the side edges of the bed frame. The two angle bars or side rail members 20 and 21, are slidably joined together by a pair of overlapping lugs 21', carried by the rail member 21. A horizontally disposed key hole opening 22 perforates the vertical leg of the rail member 20, for a purpose hereinafter explained.

Perforating the vertical leg of the rail member 21 is a horizontally disposed slotted or elongated opening 22', having an enlarged part 22", which opening is in register with a key hole opening 23 perforating the inner rail member 21 adjacent the outer end thereof.

Pivoted by means of the pivot pin 24, to swing in a vertical, longitudinally disposed plane with respect to the bed frame, is a fulcrumed lever 25, said lever having pivotal connection 26 with the end of a link 27, which latter carries at its opposite end a transversely extending, horizontally disposed headed wrist pin 28, the head thereof being adapted to pass through the enlarged end of the key hole opening 23 and the shank thereof being adapted to slide in the slotted portion of the key hole.

The key hole 23 is substantially similar to the key hole 22. Obviously, when the free end of the lever 25 is moved upwardly about its pivot 24, the pin will engage the rail member 20 and push the latter longitudinally to extend the bed rail, the lever 25 then assuming the position shown in Figure 3 of the drawings, wherein the side rail is shown fully extended and the lever and link are in longitudinal alinement.

Owing to the relatively small distance between the pivots 24 and 26 and the total length of the lever 25, a considerable pushing force is exerted at the pivot 26 to slide the rail members away from each other, this device being utilized for stretching the bed spring in a manner to be hereinafter explained. The lever 25 and link 27 may be termed toggle mechanism in that the link and lever may be thrown into longitudinal alinement.

At its free end, each of the side rails is provided with a supporting leg 29, the latter being pivoted by means of a pivot 30 to the rail in a manner to fold against the under side thereof, as indicated in Figure 20 of the drawings. A suitable brace member 31, pivoted at 32 to the side rail member 21, is detachably secured to the supporting leg 29 in the following manner: Perforating both flanges of the leg are openings 33, through either of which is adapted to extend a pin 33', forming an integral part of the brace member 31 and being located at the free end thereof. The pin is formed with a transverse slot 33", which slot is adapted to receive, edgewise, a locking member 34 (Figure 21), which member is pivotally mounted as by means of a pivot pin 35 on the inner side of the supporting leg 29, there being one locking member for each of the legs of the angle bar forming the supporting leg. Thus, when the supporting leg is swung to vertical operative position, the pin 33' of the brace member is inserted in the opening 33 and the locking member 34 is then moved upon its pivot to enter the slot 33" whereby the brace member is locked in position, it being understood that each of the side rails is provided at its free end with a supporting leg, substantially similar to the one just described, each leg having two brace members, as shown in Figure 21 of the drawings. When the locking members are not in service, they may be folded against the leg, as shown in Figure 20. In the top edge of the vertical angle leg of the rail member 21, is a notch 36 adapted to receive the pin 33' of the brace member, so that the brace member may be swung about its pivot 32 and be folded against the rail member, as shown in Figure 20. When the supporting leg and brace member are thus folded, the rail member 21 may be slid inwardly upon the rail member 20, and then collectively be swung about their respective pivots 18 and 18' to assume a position parallel with the rear wall 21 of the box, as indicated in part by dotted lines in Figure 2 of the drawings. Thus, both of the bed rails may be collapsed and swung into the box, the pivot 18' of the rail 19' having been spaced further from the rear wall 2 of the box for that purpose. As hereinbefore stated, both the side rails of the bed are of similar construction, excepting that they are rights and lefts, the same designating numbers being applied in the drawings.

Pivoted by means of the pivot 37 (Figure 2) to the end of the rail 19', is the end bed rail 38, the latter being constructed to fold against the side rail member 21 to move with the latter in a sliding movement over the rail member 20 to enable the side rail in its collapsed state to be swung into the box. The position assumed by the member 38 when folded against the side rail 19' is best indicated in Figure 12 of the drawings. Secured to the under side of the rail 38 is a headed pin 39, best shown in Figure 10 of the drawings, the shank of said pin being adapted to enter the notch 40 in the end of the rail member 21 (Figure 9). To lock the end rail 38 in position, the pin 39 is entered into the slot 40 and the supporting leg 29 then swung upon its pivot 30 to close the opening of said notch, as shown in Figure 9 of the drawings, thus holding the rail 38 in locked position.

Figure 8:
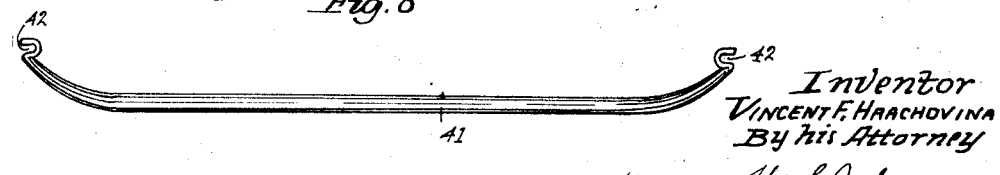
Figure 8, is a side view of the bed brace.

Brace members 31, similar to those shown in Figure 9, are provided to brace the supporting legs to the end member 38, said end member being provided with suitable notches 36 adapted to receive the pins 33' of the brace members, when the end member 38 is to be folded out of operative position. Extending between the side rails of the bed is a spreader bar 41, best shown in Figure 8 of the drawings, said bar being formed with laterally opening jaws 42 adapted to receive collectively the superposed horizontal legs of the side rails, as shown in Figure 2, the spreader bar being constructed to be offset downwardly from the plane of the bed frame, as shown in Figure 23, to clear sag of the bed spring. The slot 22' (Figure 9) is enlarged at its outer end, as at 22'' to permit the head of the pin 28 to be disengaged from the slot and inserted in the key hole opening 22, the side rail 21 having been previously slid inwardly for that purpose. Obviously, the two rail members 20 and 21 may thus be extended from the key hole 22 for a purpose hereinafter explained.

Figure 3:
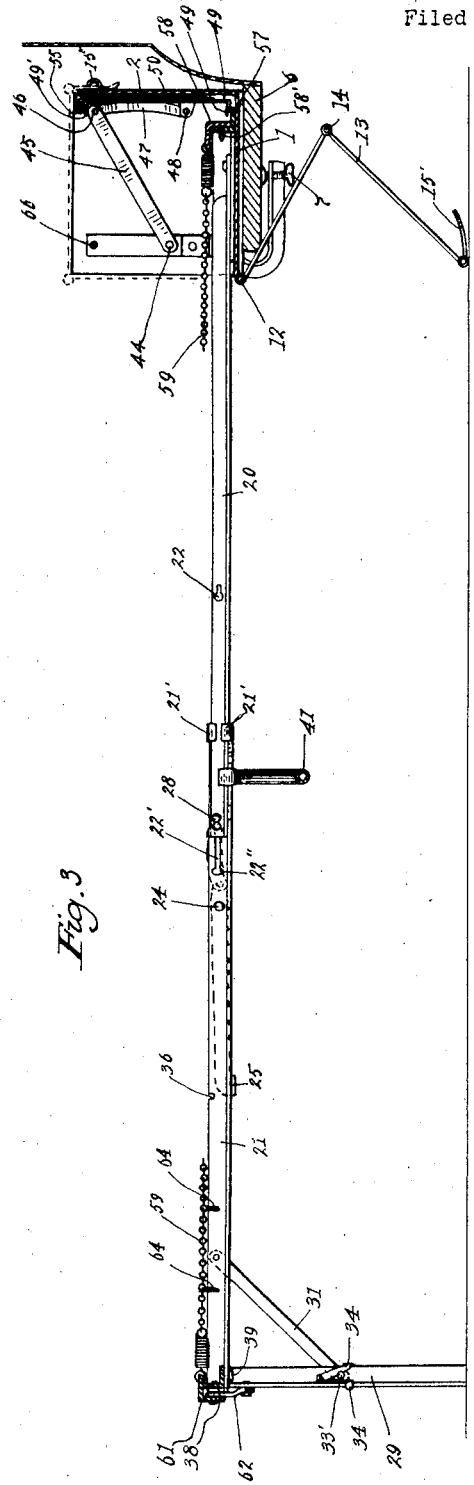
Figure 3, is a longitudinal sectional view on line 3—3 of Figure 2.
Figure 4:
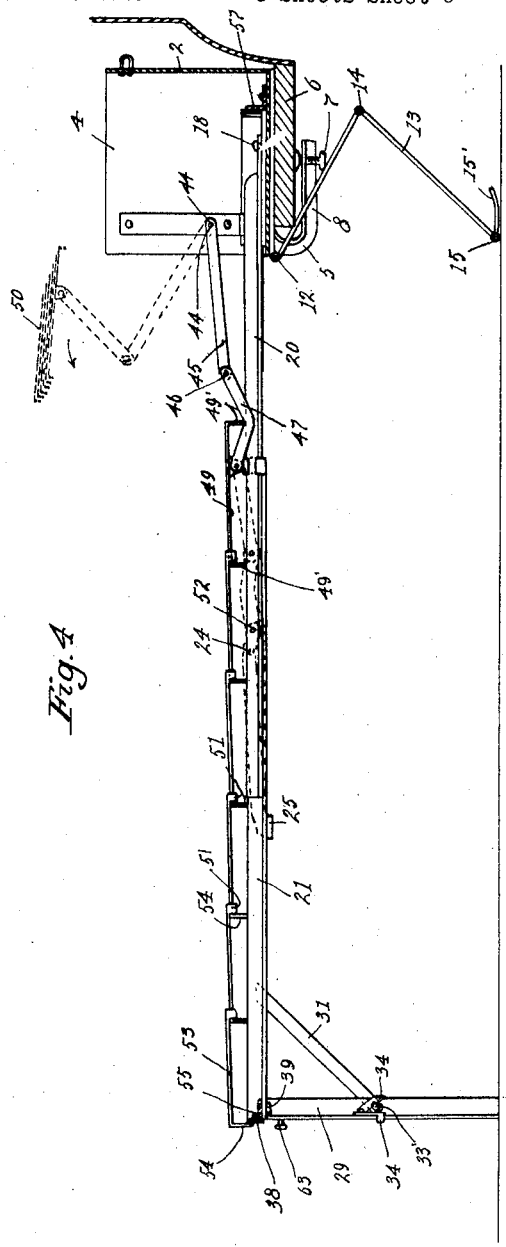
Figure 4, is a longitudinal sectional view showing the table in operative position.

Lugs 43, one secured to either of the end walls 3 and 4 of the box, assist in stabilizing the side rails when in operative position, as shown in Figure 9. Pivoted, one in each of the end walls 3 and 4, by means of a pivot 44, is a link member 45 having pivotal connection 46 with a link 47, which latter in turn has pivotal connection 48 with a table board 49, said table board being formed at either of its long edges with a flange 49', as is best shown in Figures 3 and 12 of the drawings. As shown by dotted lines in Figure 4, the link member 45 may be swung about its pivot 44 to enable a group of interconnected table top plates 50, including the top member 49, to be bodily raised out of the position as indicated in dotted lines. A further swinging movement of the link member 45 will bring the table plate 49 into engagement with the top of the side rails of the bed frame. Slidably attached to the board 49, as by means of the downwardly and inwardly extending ears 51 (Figure 18) is a table top plate 52, which in turn has similar connection with a group of similarly connected top plates, including the end plate 53 (Figure 4), each of the intermediate top plates being formed with a downturned flange 54 to form a stop, adapted to engage the lugs 51 of the next adjacent plate, as well as a reinforcement for the long edge of the plates, whereby is formed a table top for utility purposes, such as serving meals and the like. The end board 53 is provided with an inwardly turned lug 55, located intermediate its ends, said lug being adapted to engage an opening 56 in the end of the vertical leg of the end bed member 38, as shown in Figure 2. As shown in Figure 4 of the drawings, the flange 54 of the top plate 53 overlaps the vertical leg of the end bed member 38, the pin 55 preventing it from becoming disengaged therefrom. The top plates from 49 to 53, inclusive, are of a proportion to enable the flange 54 of the end plate 53 to freely engage the end bed rail member 38 of the bed frame, when the top plates are in a slightly slack condition. In order to stretch the top members into taut relation, the pin 28 is placed in the notch 22 (Figure 9) and the side rail members of the bed are then extended as described in the foregoing, whereby the progressively connected top plates will be stretched taut. The top plates are of a proportion widthwise to enable them to be stacked, as shown in Figure 12 of the drawings, each member being a trifle narrower than the next succeeding one to bring the flanges 54 thereof in superposed relation at the top of the stack. Further, when so stacked against the inner wall 2 of the box, as shown in Figure 3, the lever 45 and link 47 are so positioned as to constitute a brace tending to push the stacked table plates against the inner wall 2 of the box to thus firmly hold them against displacement during travel of the car. Secured to the bottom of the box, adjacent the stacked or superposed top plates, and disposed parallel with the rear wall 2 of the box and extending throughout the length thereof, is an angle bar 57, adapted to be loosely engaged throughout its length by a similar angle bar 58, the former having openings 57' (Figure 16) adapted to loosely receive pins 58' carried by the angle bar 58, whereby the latter is prevented from accidentally becoming disengaged from the angle bar 57.

Secured to the bar 58, which latter forms a part of a bed spring, generally designated by the number 59, is an open work wire bed spring member 60, constructed to be flexible to enable it to be rolled upon itself and be placed in the box, as shown in Figure 12 of the drawings. At its outer free end the member 60 is secured to an angle bar 61, one leg of the latter extending downwardly and having engagement with the end of the bed frame as shown in Figure 10 of the drawings. The bar 61 has depending from the inner side of its vertical leg, as by means, respectively, of pivots 61', a pair of hooks 62, these hooks being adapted to engage, respectively, headed pins 63, of which latter there is one adjacent the top of each of the supporting legs 29. Thus, the angle 61 is removably held in position on the end of the bed frame. The bed spring 59 is of such length as to be, when in engagement with the angle bars 57 and 38, in slightly slack state, when the lever 25 is in the position shown in Figure 9 of the drawings. Thus, when the lever is moved from the position indicated in Figure 9 to the position indicated in Figure 20, the slack in the bed spring 59 will be taken up to render it taut, it being understood that the levers 25 of each side bed rail are to be similarly moved. The spring member 59 includes a plurality of hooks 64 adapted to loosely engage the side rails of the bed to hold the spring in a taut state between the latter.

In operation, the device is unfolded from the position shown in Figure 12 of the drawings in the following manner: The strap members 13 are disengaged from the box and swung to a position underneath the running board, as shown in Figure 4 of the drawings. The cover 10 is now removed and may be unfolded to form a seat. The front wall 9 of the box is then removed and may also be unfolded to form a seat. The bedding material, such as the mattress, indicated by the number 65, as well as the spring 59 is then removed, and the side rails 19 and 19' are then swung outwardly upon their respective pivots 18 and 18' to extend at right angles to the box. The members 21 are now slid outwardly to a position to enable the head of the pin 28 to be inserted in the key hole opening 23 of the rail member 20, or in other words, to the position in Figure 9 of the drawings. The supporting leg of the side rail 19' is now swung to supporting position and the end frame member 38 is then swung upon its pivot 37 to extend at right angles to the side rail 19'. The pin 39 of the end rail is now inserted in the slot 40 of the side rail 19, and the supporting leg 29 of the latter is then swung into vertical position. The braces 31 are now adjusted to be locked in the openings 33 of the supporting legs, as described in the foregoing. The spring 59 is now placed in position to bring its angle members 58 and 61, respectively, into engagement with the angles 57 and 38 of the bed frame, and the latter locked by means of its hooks 62 to the pin 63 on the supporting leg. The levers 25 of the toggle mechanisms are now actuated to stretch the spring taut and the hooks 64 are then placed in engagement with the edges of the side rail of the bed. The bed is now ready for the mattress.

When it is desired to use the bed as a support for the top plates, the pin 28 is withdrawn from the opening 23, and the side rail member 21 is slid to enable the pin to be inserted in the key hole opening 22. The table plates are now collectively lifted out of the box, as hereinbefore described, and placed upon the bed frame, as shown in Figure 4 of the drawings. The levers 25 are now actuated to stretch the table plates taut, the inner end of the table top being supported on the pivots 44. In the process of folding the device, the parts are positioned in the box as indicated in Figure 12, the front wall 9 of the box being provided with hooks 65 adapted to engage pins 66 in the end walls, respectively, of the box.

I claim:
1. In a device of the class described, comprising in combination, a box adapted to be secured to the running board of an automobile, and having a removable front wall, a pair of side rails, one pivoted in each end of the box in the bottom thereof in a manner to be swung horizontally to extend at right angles to the box from a point located adjacent the ends thereof, each of said rails being constructed of two component rail members joined together in a manner to be slidable, one upon the other, a supporting leg for each of said side rails located at the outer end thereof and mounted to be folded to be in longitudinal alinement therewith, an end rail swingably mounted on the outer end of one of said side rails to swing in a horizontal plane thereon and fold against the side thereof, means for effecting a connection between the free end of said end rail and the outer end of the second of said side rails when both rails are extended, a flexible bed spring including means for detachably attaching opposite ends thereof, respectively, to said box and end rail, end toggle mechanism for each of said side rails in operative connection with both, respectively, with their component rail members for extending and so holding the same to stretch said bed spring taut, each toggle mechanism including a longitudinally disposed elongated opening in one of the component rail members, a relatively short opening in register with said elongated opening in the second component rail member, a link, a pin carried thereby adapted to extend through both of said openings, and an actuating lever having pivotal connection with said link, and being fulcrumed on the rail member formed with the elongated opening in a manner to be moved into approximately longitudinal alinement with the link.

2. In a device of the class described, comprising in combination, a box adapted to be secured to the running board of an automobile and having a readily removable front side, a bed frame, a flexible bed spring detachably attached to said box and the outer end of the frame, said bed frame comprising a pair of frame members pivoted to the floor of the box, one adjacent each end thereof, each member being adapted to swing in a horizontal plane to extend at right angles to the box and being composed of two parts connected in a manner to be longitudinally extensible, the outer of said parts having a pivotable joint spaced from its outer end to be bent downwardly thereat to form a supporting leg, a third bed frame member mounted in a manner to detachably connect the aforesaid bed frame members at the pivotable joints thereof and fold against one of the frame members to swing therewith, manually operated separate toggle mechanism for each of said rails, each located, respectively, intermediate the ends of the rail and having operative connection with the component parts thereof, in a manner to enable the rail to be extended at will to stretch said spring and be so held, a plurality of table top plates normally in superposed state, positioned collectively in parallelism with the rear wall of said box, connections between adjacent plates of a character to enable the plates to be connectedly extended to form a table top, link connections between the superposed table plates and the ends of said box, said link connections being proportioned and disposed to enable said table plates to be swung in superposed state to be brought into engagement with said rails and be extended thereon, means carried by the outer table plate whereby to engage said third frame member in a manner to permit the extended plates to be stretched taut responsive to actuation of said toggle mechanisms.

3. In a device of the class described, in combination with a box adapted to be secured to the running board of an automobile and having a removable front wall whereby it is adapted to form the end member of a bed frame; of a pair of side bed frame members, one pivoted adjacent each end of the box in the bottom thereof to swing outwardly and extend at right angles to the box and being of collapsible construction to be collapsed and swung bodily into the box, each of said members having a leg adapted to be folded against the side thereof, a third frame member mounted in a manner to readily detachably connect said side members at the outer ends thereof and be folded against the side of one of same to swing into the box therewith, each of said side members including two component parts in overlapping relation at their inner ends, and a spreader member extending between said side members and formed at its respective ends with jaws adapted to engage, respectively, with said overlapping portions of each of said side rails, for the purpose set forth.

4. In a device of the class described, in combination with a box adapted to be secured to the running board of an automobile and having a removable front wall whereby it is adapted to form the end member of a bed frame; of side bed frame members, one pivoted adjacent each end of the box in the bottom thereof to swing outwardly and extend at right angles to the box and being constructed to be collapsed and swung bodily into the box, each of said side members having a leg adapted to be folded against the side thereof, a third frame member pivoted to one of said side rails to be folded thereagainst and being detachably connected at its free end to the other side member to form the end of the bed frame, a flexible device, adapted to support a mattress, detachably attached at its outer end to the end of said bed frame, and having at its inner end an angle bar disposed in parallelism with said box, pins extending longitudinally of the bed frame carried by said bar, and an angle bar having openings to receive said pins secured to the bottom of said box and adapted to engage with the aforesaid angle bar throughout the length thereof to detachably secure said flexible device to the box.

5. In a device of the class described, comprising in combination, a bed frame including a device adapted to be attached to an automobile running board, said device having a bottom, end walls, and a rear wall and forming one end of the bed frame, said bed frame being constructed to detachably support a flexible bed spring at the ends of the latter and comprising side rails, an end rail connecting the outer ends of said side rails and including a readily detachable and pivotal connection, respectively, with said side rails to render the same swingable horizontally, each of said side rails having a leg adapted to be folded thereagainst and being formed of an inner and outer rail member disposed in overlapping relation and being connected in a manner to be slidable one upon the other, separate manually operated mechanism for each of said side rails, operatively connected, respectively, with the component parts thereof, for sliding one rail member upon the other to effect an extension of the side rails when the mechanisms are actuated, said mechanisms including reciprocatory pins having readily detachable connections, respectively, with the inner rail members to stretch said spring taut when the recited mechanisms are actuated, a plurality of slidably overlapping interconnected table top plates pivotally mounted in the end walls of said device in a manner to be extended over said side rails to and into engagement with said end rail to be held against longitudinal movement thereby, and an opening and means in each of said inner rail members adapted to engage, respectively, said pins to change the location of the point of attachment of the latter for the purpose of pulling said interconnected table top plates collectively taut by virtue of the actuation of said mechanisms.

6. A collapsible combination bed spring and table top support for use in connection with an elevated board, comprised in part of a bed frame, one end thereof being adapted to be removably secured to said board, said frame being constructed to be longitudinally extensible to a predetermined degree to enable the attachment of a bed spring, a flexible bed spring detachably secured, respectively, at its ends to the outer end of said frame and to said device, said bed frame including lever actuated mechanism for arbitrarily extending the same a definite amount beyond said predetermined degree and so holding the same to stretch said bed spring taut, a plurality of elongated table top plates of parallel width connected at their long edges in a manner to slide upon one another to become superposed and collectively to form a table top when extended to extend over said bed frame and be supported thereon and detachably engage with the free outer end thereof in a manner to be held against longitudinal movement thereon, and connections of a character between said device and table top plates to permit the latter when in extended state to be stretched taut by virtue of the actuation of said lever mechanism and be bodily swung in superposed state to said device to be supported thereon.

In testimony whereof I affix my signature.

VINCENT F. HRACHOVINA.